United States Patent
Marshall et al.

[11] Patent Number: 6,139,166
[45] Date of Patent: Oct. 31, 2000

[54] LUMINAIRE HAVING BEAM SPLITTERS FOR MIXING LIGHT FROM DIFFERENT COLOR LED'S

[75] Inventors: Thomas M. Marshall, Hartsdale; Michael D. Pashley, Cortlandt Manor, both of N.Y.; Matthijs H. Keuper, Eindhoven, Netherlands

[73] Assignees: LumiLeds Lighting B.V., Best, Netherlands; Philips Electronics North America Corp., New York, N.Y.

[21] Appl. No.: 09/338,997

[22] Filed: Jun. 24, 1999

[51] Int. Cl.$^7$ ........................................................ F21V 9/00
[52] U.S. Cl. ............................ 362/231; 362/230; 362/346; 362/800
[58] Field of Search .................................... 362/240, 241, 362/245, 247, 297, 329, 346, 800, 230, 231; 359/173, 171

[56] References Cited

U.S. PATENT DOCUMENTS

| | | | |
|---|---|---|---|
| 2,673,923 | 3/1954 | Williams | 362/231 |
| 3,905,684 | 9/1975 | Cook et al. | 359/173 |
| 5,375,043 | 12/1994 | Tokunaga | 362/231 |

OTHER PUBLICATIONS

Iwasaki Electric Co. Ltd., "Multicolor LED Light Source", JP 0–143367, Nov. 1987, (Abstract).
Iwasaki Electric Co. Ltd, "Polychromatic Light Emitting Diode Lamp", JP 6–237017, Oct. 1993, (Abstract).

*Primary Examiner*—Sandra O'Shea
*Assistant Examiner*—Bertrand Zeade
*Attorney, Agent, or Firm*—F. Brice Faller

[57] ABSTRACT

Apparatus for mixing light from discrete LED light sources utilizes beam splitters which each have a semi-reflective layer which partially transmits and partially reflects light of any wavelength incident thereon. Each semi-reflective layer is situated in a transparent prismatic black between reflective surfaces on parallel outside faces of the block so that two parallel input beams are mixed and transmitted as two parallel mixed beams of like color. For a square array of light sources, a first mixing stage consists of two such prismatic blocks arranged side-by-side, and a second mixing stage consists of two such prismatic blocks arranged side-by-side and rotated 90 degrees to the first stage. The second stage is arranged to receive a square array of mixed beams and produces four identical output beams. The colors of the light sources are chosen so that all output beams are white.

14 Claims, 4 Drawing Sheets

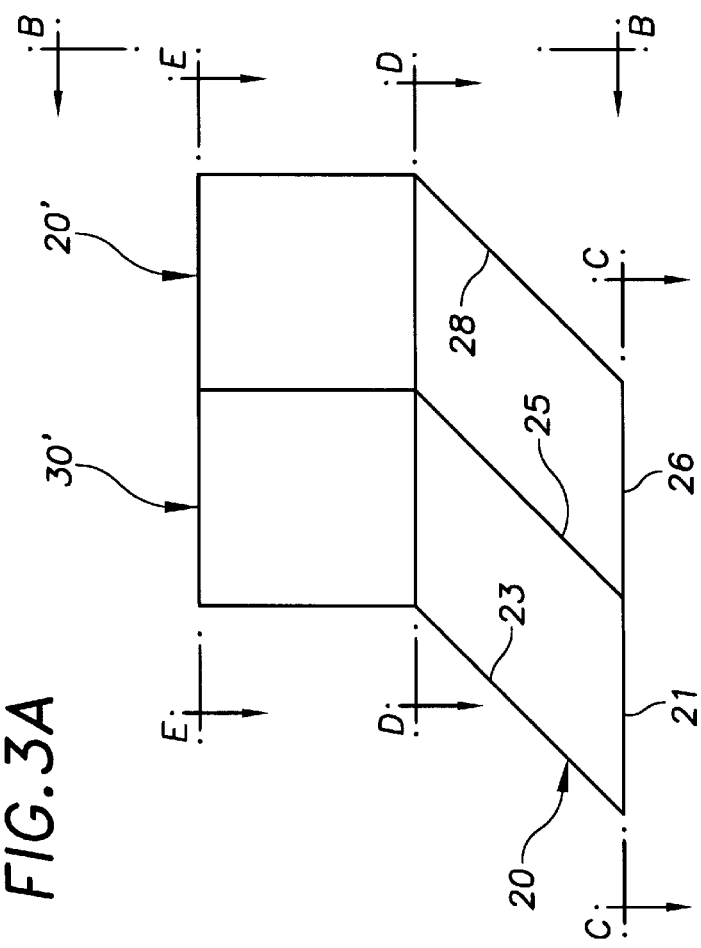
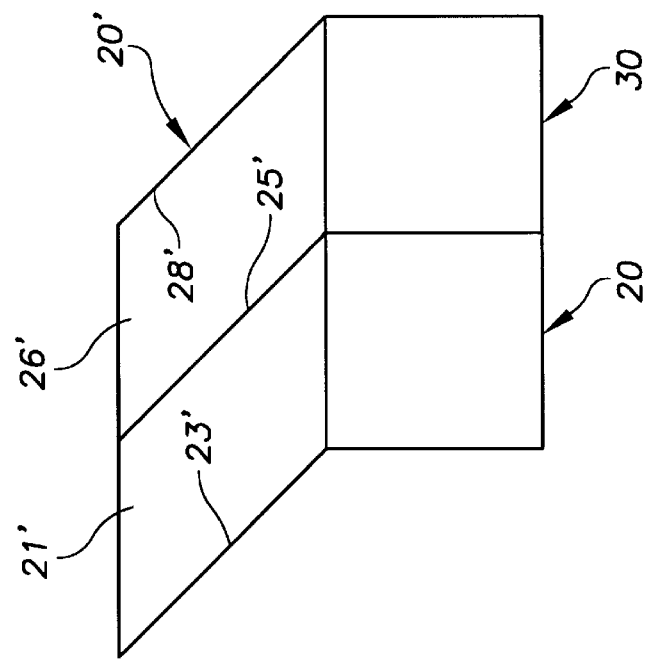
FIG.3A
FIG.3B

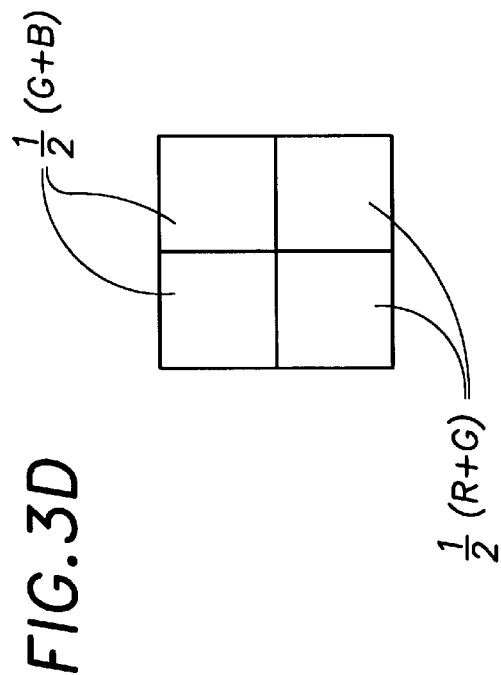
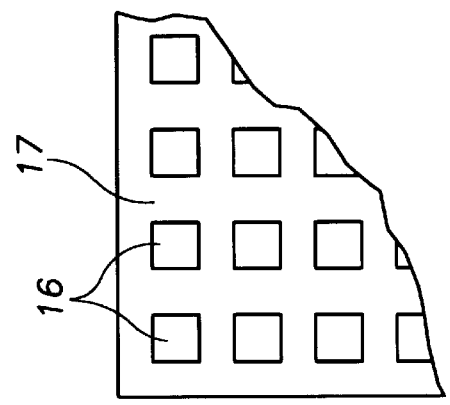
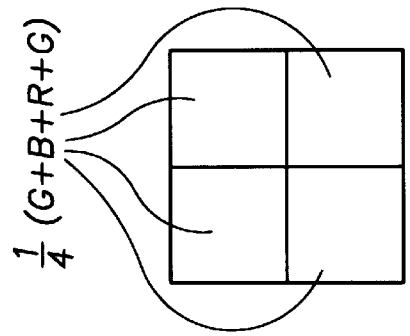
FIG.3C
FIG.3D
FIG.3E
FIG.4

LUMINAIRE HAVING BEAM SPLITTERS FOR MIXING LIGHT FROM DIFFERENT COLOR LED'S

BACKGROUND OF THE INVENTION

The invention relates to a luminaire for mixing light from different color LEDs, in particular to produce white light.

The standard light source for small to moderate size narrow beam lighting for accent lighting and general illumination is the incandescent/halogen bulb, such as a PAR (parabolic aluminized reflector) lamp. These sources are compact and versatile, but they are not very efficient. A given lamp operates at a given color temperature for a fixed power, and while they are dimmable, the color temperature shifts with applied power according to the blackbody law, which may or may not be the variation that the user desires.

An array of LEDs in each of a plurality of colors offers the possibility of creating a luminaire in which the color temperature may be controlled at any power level, thereby enabling a lamp which is dimmable and emits a uniformly white light at any power level.

The English language abstract of JP-A-06 237 017 discloses a polychromatic light emitting diode lamp having a 3×3 array of light emitting diodes of two types, a first type having elements for emitting red light and blue light, and a second type having elements for emitting red light and green light. The stated object is to mix colors so that the mixed color would be recognized as the same color in any direction, but there are no optical provisions to facilitate mixing. It is simply a two-dimensional array of LEDs in a lamp case filled with resin, which would do little more than provide some diffusion.

U.S. application Ser. No. 09/277,645, filed Mar. 26, 1999, discloses a luminaire having a reflector which mixes light from a multi-color array of LED's. The array is arranged in the entrance aperture of a reflecting tube which preferably flares outward toward the exit aperture, like a horn, and has a square or other non-round cross-section. The object is to produce a collimated beam of white light in the manner of a spotlight. However the design is only appropriate for beams greater than about 2×15 degrees divergence.

The English language abstract of JP-A-01 143 367 discloses an arrangement employing a dichroic filter for mixing light from two LED light sources emitting light beams at right angles to each other. The filter is arranged at 45 degrees to each beam, and is fully transmissive to a red beam and fully reflective to a yellow beam. This offers three color possibilities for the output beam, depending upon which LEDs are powered. However there is no suggestion of using beam splitters to mix the light, mixing light of more than two colors, or producing white light.

SUMMARY OF THE INVENTION

The object of the invention is to mix the light from different colored LEDs (e.g. red, green, and blue) to produce white light. The apparatus according to the invention mixes light beams input from up to four different sources, provided that the sources have the same initial beam profiles. The output beams have the same distribution as the input beams. Therefore, if the input beams are highly collimated, the output white beams will also be highly collimated. The mixing is theoretically perfect, provided that the beam splitters have ideal performance. While practical beam splitters still have some non-ideal characteristics which detract from perfect color mixing, the achievable color mixing is closer to ideal than previous methods.

According to the invention, light is mixed using a beam splitter having a semi-reflective layer which both reflects and transmits light of any wavelength incident thereon. The semi-reflective layer is arranged to reflect part of a first input beam and transmit part of a second input beam as a first mixed beam, and to transmit part of the first input beam and reflect part of the second input beam as a second mixed beam.

The semi-reflective layer is arranged at 45 degrees to the input beams, which are incident on opposite sides of the layer at 90 degrees to each other. The beams are emitted from respective light sources substantially in parallel, the first beam being incident on a first reflective surface at 45 degrees and reflected toward the semi-reflective layer. The second mixed beam is incident on a second reflective surface at 45 degrees and reflected therefrom in parallel with the first mixed beam.

The apparatus is conveniently realized with a prismatic block of transparent material having parallel external faces which carry the reflective surfaces for internal reflection, the semi-reflective layer being arranged between and parallel to the reflective surfaces. The reflective surfaces can be achieved either by coated reflective layers, or by total internal reflection, which depends on the angle of incidence.

Where the first and second input beams have different colors and the beams are split equally, the first and second mixed beams will have the same color.

The prismatic block is preferably combined with a second prismatic block which mixes third and fourth input beams to produce third and fourth mixed beams having the same color. Where the input beams are in a linear array, a third prismatic block having twice the size of the first two is used to mix the four mixed beams to produce four output beam which all have the same color.

In an especially preferred embodiment the four light sources are arranged in a square array and the light mixing is done in two stages, each consisting of two prismatic blocks as described, the second stage being rotated ninety degrees from the first stage.

According to either embodiment having four input beams their colors may be chosen so that all four output beams consist of white light. For example, the first stage can mix red beam and a green beam to form identical first and second mixed beams, and a blue beam and a green beam to form four identical third and fourth mixed beams. The second stage then mixes one mixed beam from each pair to form first and second white output beams, and the other beam from each pair to form third and fourth white output beams.

BRIEF DESCRIPTION OF THE DRAWING

FIG. 3A is a side view of a two stage prismatic block for mixing light beams from four LED light sources in a square array;

FIG. 3B is a side view of the two stage block of FIG. 4A as seen orthogonally to that view;

FIG. 3C is a schematic plan view of the input beams;

FIG. 3D is a schematic plan view of the mixed beams emerging from the first stage;

FIG. 3E is a schematic plan view of the output beams;

FIG. 4 is a plan view of part of a semi-reflective layer having reflective areas against a transparent background.

DETAILED DESCRIPTION OF THE PREFERRED EMBODIMENT

Figure 1:
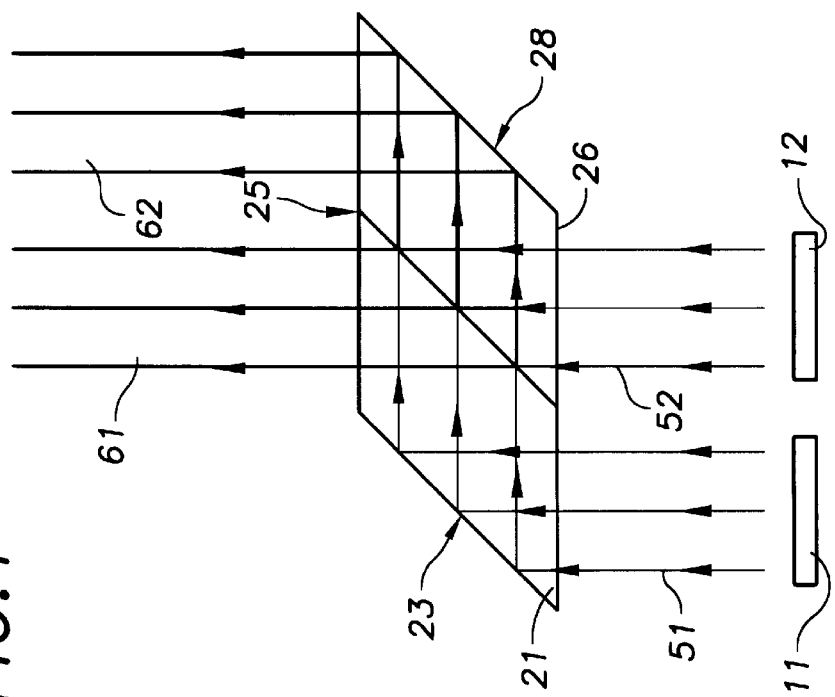
FIG. 1 is a schematic view of a prismatic block mixing light beams from two LED light sources.

Referring to FIG. 1, the beam mixing principle according to the invention is embodied by a prismatic block 20 which receives first and second input beams 51 and 52 from respective first and second LED light sources 11 and 12. Each LED light source includes a single LED and optics for defining a light beam, or may include an array of LED's emitting light of a single color.

The first prismatic block 20 comprises a first prism 21 and a second prism 26 having a semi-reflective layer 25 sandwiched there-between. The semi-reflective layer 25 both transmits and reflects light of any wavelength which is incident thereon. Both prisms 21 and 26 are made of transparent material such as PMMA, polycarbonate, or glass. The first prism 21 has a first reflective surface 23 parallel to the semi-reflective layer 25, at 45 degrees to parallel transparent surfaces which receive and transmit light. The second prism 26 has a second reflective surface 28 which is also parallel to the semi-reflective layer 25, at 45 degrees to parallel transparent surfaces which receive and transmit light.

The first and second LED light sources 11, 12 are arranged so that the light beams 51, 52 are substantially parallel. The first light beam 51 is reflected from first reflective surface 23 at an angle of 45 degrees, and is incident on the semi-reflective layer 25 at an angle of 45 degrees. Discounting losses, about half of this beam is reflected at 45 degrees to the layer 25, and half is transmitted. The second light beam 52 is incident on the other side of semi-reflective layer 25 at 45 degrees, where (discounting losses) about half the beam is transmitted and half is reflected. The reflected portion of the first beam 51 and the transmitted portion of the second beam 52 result in a first mixed beam 61. The transmitted portion of the first beam 51 and the reflected portion of the second beam 52 result in a second mixed beam 62. The latter is reflected from the second reflective surface 28 and thus rendered parallel to the first mixed beam 61. Where the first and second input beams 51, 52 are different colors, and each is split into equal parts by the semi-reflective layer 25, each of the mixed beams 61, 62 has the same color.

Figure 2A:
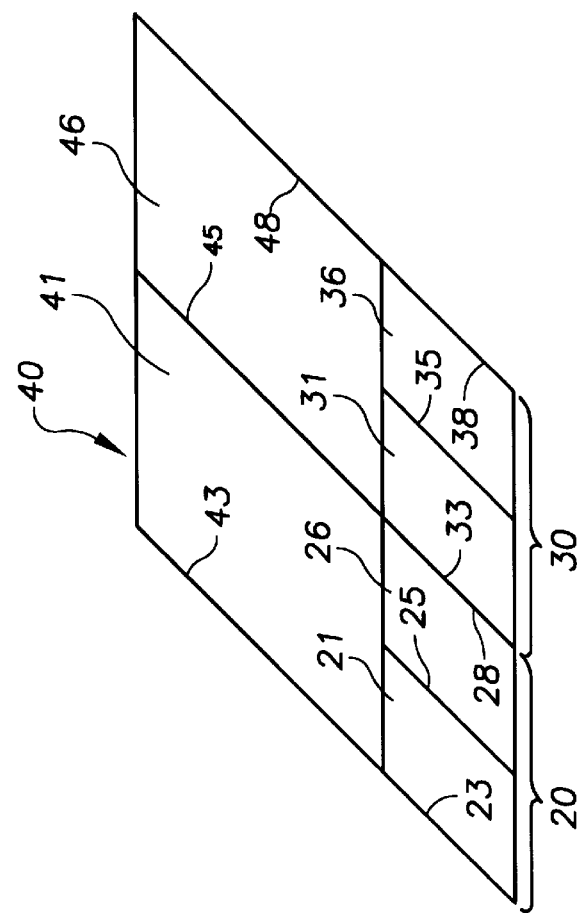
FIG. 2A is a side view of a prismatic block for mixing light beams from four LED light sources in a linear array.

FIG. 2A depicts a four beam light mixer. A first mixing stage consists of two identical prismatic blocks 20, 30, the block 30 having a semi-reflective layer 35 sandwiched between third and fourth prisms 31, 36 having respective third and fourth reflective surfaces 33, 38. A second mixing stage consists of a third prismatic block 40 which is twice the size of each block 20, 30. That is, its linear dimensions in the plane of the page are doubled. The block 40 has a semi-reflective layer 45 sandwiched between fifth and sixth prisms 41, 46 having respective fifth and sixth reflective surfaces 43, 48.

Figure 2B:
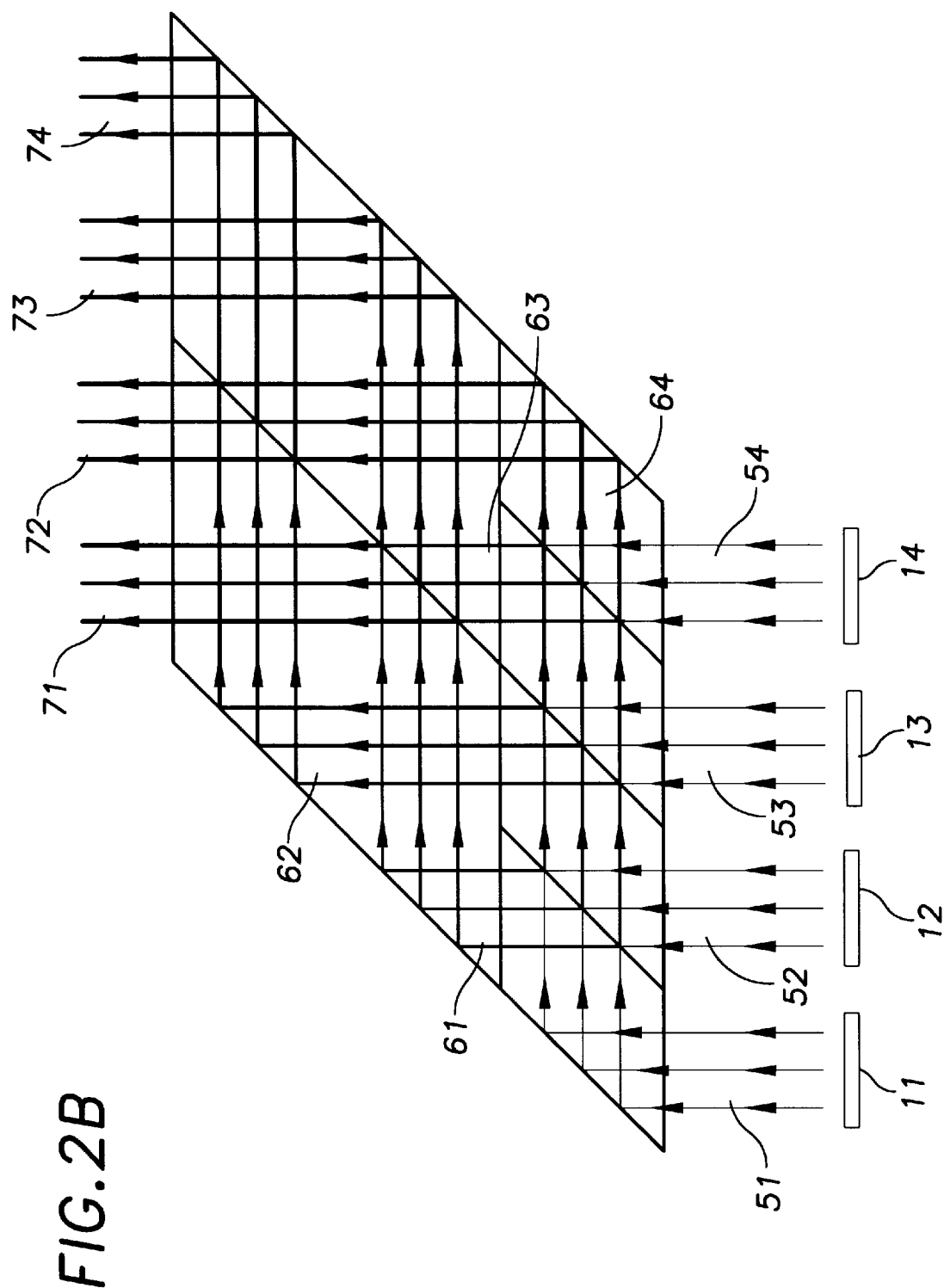
FIG. 2B is schematic view showing mixing of light beams by the prismatic lock of FIG. 2A.

FIG. 2B shows how light from four led light sources 11, 12, 13, 14 is mixed by the four beam light mixer of FIG. 2A. The first and second input beams 51, 52 are mixed in the first block 20 to produce first and second mixed beams 61, 62 which are reflected by first reflective surface 43 toward semi-reflective layer 45 where they are split. The third and fourth input beams 53, 54 are mixed in the second block 30 to produce third and fourth mixed beams 63, 64 which are split by the semi-reflective layer 45 and partially reflected toward second reflective layer 48.

The reflected portions of the first and second mixed beams 61, 62 mix with the transmitted portions of respective third and fourth mixed beams 63, 64 and emerge from the block 40 as first and second output beams 71, 72. The transmitted portions of the first and second mixed beams 61, 62 mix with the reflected portions of respective third and fourth mixed beams 63, 64 and, after reflection from second reflective surface 48, emerge from the block 40 as third and fourth output beams 73, 74.

As noted above, where the semi-reflective surfaces 25 and 35 split the incident input beams equally, the mixed beams in each pair 61, 62 and 63, 64 will have the same color. On further mixing in the second stage, each of the output beams 71, 72, 73, 74 will have the same color. Where the light sources 11, 12, 13, 14 emit input beams 51, 52, 53, 54 in respective colors red, green, blue, and green, it is possible for each of the output beams 71, 72, 73, 74 to be white light. Where the intensity of each beam 51, 52, 53, 54 is represented by R, G, B, G, the intensity of each mixed beam 61, 62 is ½ (R+G) and the intensity of each mixed beam 63, 64 is ½ (B+G). The intensity of each output beam 71, 72, 73, 74 is ¼ (R+G+B+G).

It is also possible to mix four light beams emitted by four LED light sources in a square array, as illustrated in FIGS. 3A–3E, by means of four prismatic blocks of the type illustrated in FIG. 1. The first stage consists of first and second prismatic blocks 20, 30, while the second stage consists of identical third and fourth blocks 20', 30', which are rotated ninety degrees from blocks 20, 30. Each pair of input beams is split and mixed to form a pair of identical mixed beams, and each mixed beam in one pair is mixed with a mixed beam in the other pair to form four identical output beams. This is illustrated schematically in FIGS. 3C, 3D, and 3E for four input beams red, green, blue, and green, where the green beams are arranged on a diagonal. The input aperture size of each prism is defined by the input beam size, the input beam size being the minimum aperture size. Ideally the input beam width should be no more than 2×10 to 2×15 degrees. Wider beams will work, with loss in efficiency.

Each pair of prismatic blocks 20,30 and 20', 30' may be manufactured as single pair of prisms which receive all four input beams, each prism having a rectangular face which receives two side by side input beams. Here the boundary between input apertures is defined by the beams themselves, and collimation is especially important.

The prismatic blocks can be extended in as large an array of modules in two dimensions as desired, in both linear and square input arrays, so long as mixing remains in blocks of four input beams. The flat surfaces of the prisms not only makes assembly in a geometrically efficient way possible, but also facilitates attachment of collimating optics to the input faces and beam shaping or deflecting optics to the output faces.

The semi-reflective surfaces 25, 35, 45 may be homogenous layers of silver or the like deposited on one of the flanking first and second prisms by sputtering or other thin film technique to a thickness which both reflects and transmits, generally on the order of 10 angstroms. The other prism is then emplaced so that the layer is sandwiched between first and second prisms, thereby protecting it from physical damage and oxidation. The prisms may be manufactured by injection molding plastic. Where first and second stages are employed, each stage is manufactured separately and the stages are assembled.

As an alternative to a homogenous thin-film layer, the semi-reflective layer may consist of isolated reflective areas 16 against a transparent background 17, as illustrated in FIG. 4, or vice versa. The reflective areas may be applied by photo deposition techniques wherein reflective material is etched away to leave transparent areas. The reflective areas should be 100 percent reflective and should occupy 50 percent of the area of incident light. For homogeneity the size of the isolated areas should be as small as possible but not less than about 10 microns, at which point diffraction effects become significant.

The foregoing is exemplary and not intended to limit the scope of the claims which follow.

What is claimed is:

1. Apparatus for mixing light beams, said apparatus comprising a first LED light source which emits a first input beam and a second LED light source which emits a second input beam, and a first semi-reflective layer which both reflects and transmits light of any wavelength incident thereon, said first semi-reflective layer being arranged to reflect part of said first input beam and transmit part of said second input beam as a first mixed beam, and to transmit part of said first input beam and reflect part of said second input beam as a second mixed beam.

2. Apparatus as in claim 1 wherein said first and second input beams have different colors, and said first and second mixed beams have the same color.

3. Apparatus as in claim 1 wherein said semi-reflective layer is arranged at 45 degrees to said first input beam and at 45 degrees to said second input beam, said beams being incident on opposite sides of said semi-reflective layer at 90 degrees to each other.

4. Apparatus as in claim 3 further comprising a first reflective surface which is arranged at 45 degrees to said first input beam before said first input beam is incident on said semi-reflective layer, said first and second input beams being emitted from respective first and second light sources substantially in parallel.

5. Apparatus as in claim 4 further comprising a second reflective surface which is arranged at 45 degrees to said second mixed beam so that said first and second mixed beams are parallel on reflection from the respective semi-reflective layer and the second reflective surface.

6. Apparatus as in claim 5 further comprising a prismatic block of transparent material having two parallel external faces, each of said external faces having a respective one of said reflective surfaces, said semi-reflective layer being arranged in said block between and parallel to said reflective surfaces.

7. Apparatus as in claim 1 wherein said semi-reflective layer comprises a homogenous film of reflective material which is sufficiently thin to transmit part of a light beam incident thereon.

8. Apparatus as in claim 1 wherein said semi-reflective layer comprises a mixed field of reflective areas and transmissive areas.

9. Apparatus as in claim 8 wherein said semi-reflective layer comprises an array of isolated reflective areas against a transparent background.

10. Apparatus as in claim 5 further comprising a third LED source and a fourth LED light source which emit respective third and fourth input beams substantially in parallel to said first and second input beams as emitted from said first and second LED light sources, a third reflective surface which is arranged at 45 degrees to said third input beam, a second semi-reflective layer arranged to reflect part of said third input beam and transmit part of said fourth input beam as a third mixed beam, and to transmit part of said third input beam and reflect part of said fourth input beam as a fourth mixed beam, a fourth reflective surface which is arranged at 45 degrees to said fourth mixed beam so that said third and fourth mixed beams are rendered parallel to said first and second mixed beams, and means for mixing said first mixed beam with one of said third and fourth mixed beams to produce two output beams, and for mixing said second mixed beam with another of said third and fourth mixed beams to produce an additional two output beams, said four output beams being parallel.

11. Apparatus as in claim 10 wherein said four input beams are arranged in a linear array and said four output beams are arranged in a linear array.

12. Apparatus as in claim 10 wherein said four input beams are arranged in a square array and said four output beams are arranged in a square array.

13. Apparatus as in claim 10 wherein said first and second input beams have different colors, said third and fourth input beams have different colors, and said four output beams have the same color.

14. Apparatus as in claim 13 wherein said four output beams each consist of white light.

* * * * *